United States Patent
Mayer et al.

(10) Patent No.: US 10,887,548 B2
(45) Date of Patent: Jan. 5, 2021

(54) SCALING IMAGE OF SPEAKER'S FACE BASED ON DISTANCE OF FACE AND SIZE OF DISPLAY

(71) Applicant: GOOGLE LLC, Mountain View, CA (US)

(72) Inventors: Brandon Mayer, New York, NY (US); Luke Sorenson, New York, NY (US); Matthew Frazier, Long Island City, NY (US); Wei Guan, Jersey City, NY (US); James McGill, New York, NY (US); Zachary Yorke, Brooklyn, NY (US); Adrien Baranes, Brooklyn, NY (US); John Finley, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/104,572

(22) Filed: Aug. 17, 2018

(65) Prior Publication Data
US 2019/0058847 A1 Feb. 21, 2019

Related U.S. Application Data

(60) Provisional application No. 62/546,711, filed on Aug. 17, 2017.

(51) Int. Cl.
*H04N 7/15* (2006.01)
*H04N 7/14* (2006.01)
(Continued)

(52) U.S. Cl.
CPC ........... *H04N 7/15* (2013.01); *G06K 9/00248* (2013.01); *G06K 9/00335* (2013.01);
(Continued)

(58) Field of Classification Search
USPC ....................................... 348/14.08
See application file for complete search history.

(56) References Cited

U.S. PATENT DOCUMENTS

| | | | |
|---|---|---|---|
| 8,471,889 B1 * | 6/2013 | Lee ......................... | H04N 7/15 348/14.07 |
| 9,236,024 B2 * | 1/2016 | Coon .................... | G02C 13/003 |

(Continued)

FOREIGN PATENT DOCUMENTS

| | | |
|---|---|---|
| CN | 102298702 B | 8/2015 |
| WO | 2016159164 A1 | 10/2016 |
| WO | 2018025458 A1 | 2/2018 |

OTHER PUBLICATIONS

Ding, Yu et al., "A Multifaceted Study on Eye Contact based Speaker Identification in Three-party Conversations", Proceedings of the 2017 CHI Conference on Human Factors in Computing Systems pp. 3011-3021, May 2, 2017, XP058337715.
(Continued)

*Primary Examiner* — Amal S Zenati
(74) *Attorney, Agent, or Firm* — Brake Hughes Bellermann LLP

(57) ABSTRACT

A method can include determining a distance of a person's face from a camera that captured an image of the person's face, determining a size of a display in communication with the camera, and scaling the image based on the determined distance of the person's face and the determined size of the display.

20 Claims, 6 Drawing Sheets

(51) Int. Cl.
G10L 17/00 (2013.01)
G06K 9/00 (2006.01)
G06T 3/40 (2006.01)

(52) U.S. Cl.
CPC ............ *G10L 17/00* (2013.01); *H04N 7/147* (2013.01); *G06T 3/40* (2013.01)

(56) References Cited

U.S. PATENT DOCUMENTS

| | | |
|---|---|---|
| 9,704,216 B1 | 7/2017 | Laskar et al. |
| 2010/0171697 A1* | 7/2010 | Son ..................... H04N 13/279 345/158 |
| 2010/0315482 A1 | 12/2010 | Rosenfeld et al. |
| 2011/0141114 A1* | 6/2011 | Chen ........................ G09G 3/20 345/428 |
| 2011/0254846 A1 | 10/2011 | Lee et al. |
| 2014/0098174 A1 | 4/2014 | Summers |
| 2016/0277712 A1* | 9/2016 | Michot ..................... G06T 7/60 |
| 2016/0330406 A1 | 11/2016 | Muramatsu |
| 2018/0091738 A1 | 3/2018 | Takahashi et al. |

OTHER PUBLICATIONS

International Search Report and Written Opinion for International Application No. PCT/US2018/046923, dated Nov. 14, 2018, 31 pages.
Konig, Immanuel et al., "A new context: Screen to face distance", 2014 8th International Symposium on Medical Information and Communication Technology, IEEE, pp. 1-5, Apr. 2, 2014, XP032599717.
Saravi S. et al., "Real-Time Speaker Identification for Video Conferencing", Proceedings of the SPIE, vol. 7724, 9 pages, Apr. 30, 2010, XP040524239.

* cited by examiner

SCALING IMAGE OF SPEAKER'S FACE BASED ON DISTANCE OF FACE AND SIZE OF DISPLAY

PRIORITY CLAIM

This Application claims the benefit of priority to U.S. Provisional Application No. 62/546,711, filed on Aug. 17, 2017, the disclosure of which is hereby incorporated by reference.

TECHNICAL FIELD

This description relates to video conferencing.

BACKGROUND

Cameras can capture images of a room with conference participants to generate a video, facilitating a videoconference. Sending and/or presenting the raw captured images to and/or from a remote display can result in difficulty for viewers to focus on a current speaker, reducing the "live" feel of the videoconference.

SUMMARY

To enhance the live experience of a videoconference, a computer system can determine a distance of a face of a speaker from a camera during the video conference, determine a size of a display on which the speaker's face will be presented, and scale a captured image of the speaker's face based on the distance and size of the display so that the image of the speaker's face will appear life-size. The displayed image of the speaker's face can have a same size as if the display were a window and the speaker's face were a same distance on an opposite side of the display as the speaker's face is from the camera. The life-size appearance of the speaker's face can make the videoconference feel "live," with the speaker's face appearing to be near the person(s) viewing the speaker's face on the display.

The details of one or more implementations are set forth in the accompanying drawings and the description below. Other features will be apparent from the description and drawings, and from the claims.

DETAILED DESCRIPTION

Figure 1:
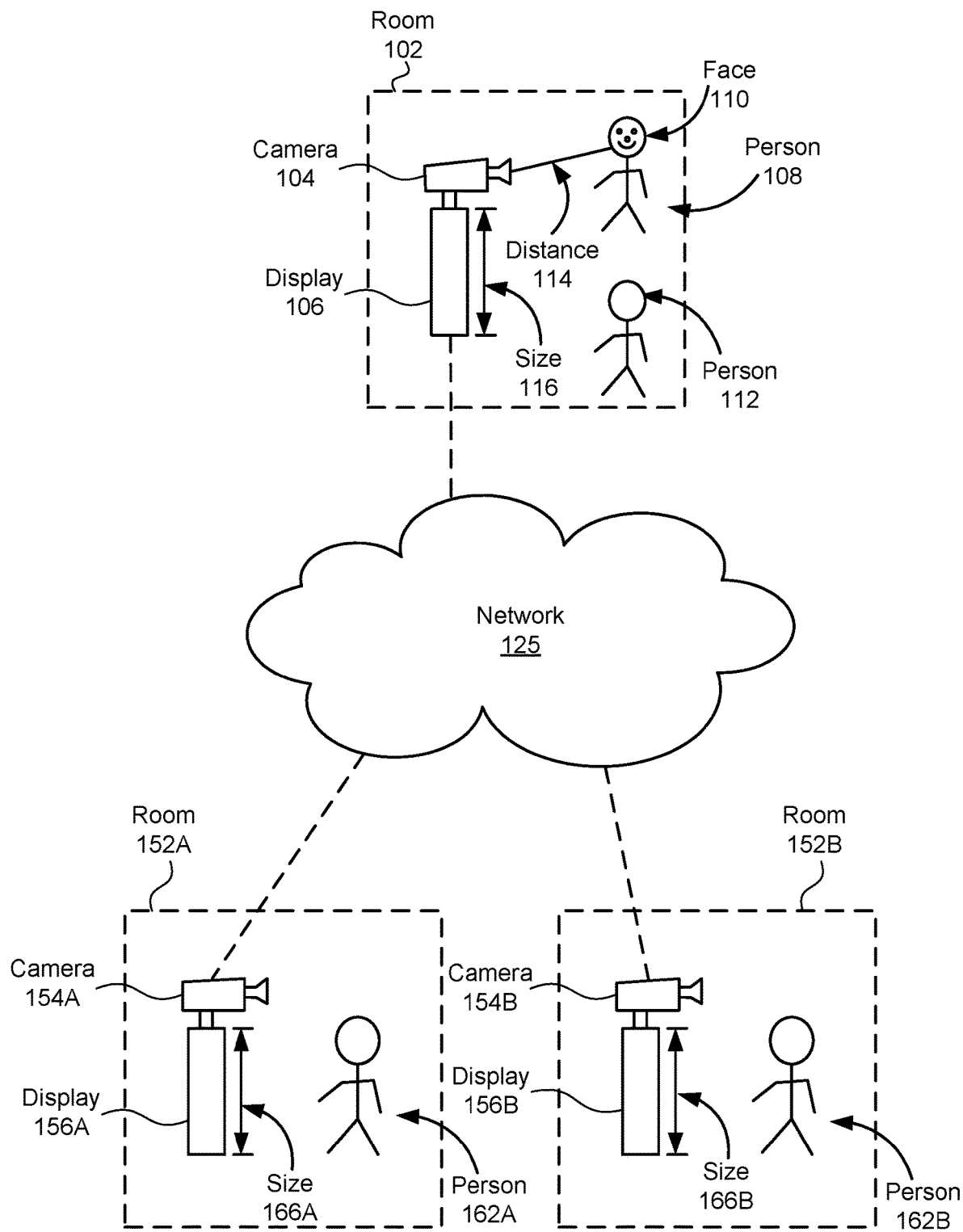
FIG. 1 is a diagram of a system for facilitating a video conference between persons in different rooms, including cameras, displays, and a network through which the cameras and displays communicate according to an example implementation.

FIG. 1 is a diagram of a system for facilitating a video conference between persons 108, 112, 162A, 162B in different rooms 102, 152A, 152B, including cameras 104, 154A, 154B, displays 106, 156A, 156B, and a network 125 through which the cameras 104, 154A, 154B and displays 106, 156A, 156B communicate according to an example implementation. The cameras 104, 154A, 154B can capture images of portions of the respective rooms 102, 152A, 152B. The portions of the rooms 102, 152A, 152B for which the cameras 104, 154A, 154B captured images can include one or more persons 108, 112, 162A, 162B, including faces 110 of one or more of the persons 108, 112, 162A, 162B. The cameras 104, 154A, 154B can send the captured images to the displays 106, 156A, 156B in the other conference rooms 102, 152A, 152B for viewing in the other conference rooms 102, 152A, 152B. The cameras 104, 154A, 154B and displays 106, 156A, 156B in each room 102, 152A, 152B can be separate devices or can be combined into single devices.

To make the captured images of faces, such as the face 110 of the person 108 in the room 102, appear life-size on the displays 156A, 156B presenting the images, the images can be scaled based on a distance 114 of the face 110 from the camera 104 and sizes 166A, 166B of the displays 156A, 156B. The scaling of the images can be performed by the camera 104 and/or a computer system controlling the camera 104, the displays 156A 156B and/or computer systems controlling the displays 156A, 156B, and/or by another computing system (such as one or more servers in communication with the cameras 104, 154A, 154B and displays 106, 156A, 156B) facilitating the video conference.

For ease of reference, functions, methods, and/or techniques will be described herein with reference to the camera 104 in the room 102 capturing an image of the person 108 and person's 108 face 110 for presentation on the displays 156A, 156B in the rooms 152A, 152B. However, functions, methods, and/or techniques described with reference to the camera 104 in the room 102 with respect to the persons 108, 112 can also be performed by the cameras 154A, 154B with respect to the persons 162A, 162B (and/or any other persons in the rooms 152A, 152B), and functions, methods, and/or techniques described with reference to the displays 156A, 156B in the rooms 152A, 152B can also be performed by the display 106. While two persons 108, 112 are shown in the room 102 and one person 162A, 162B is shown in each of rooms 152A, 152B, any number of persons can be included in each of the rooms 102, 152A, 152B.

The computer system performing the scaling can determine a distance 114 of the face 110 from the camera 104. The computer system can also determine a size 166A, 166B of the display 156A, 156B which will present the captured image of the face 110. The computer system can scale the image based on the determined distance and the determined size to generate a life-size image(s) of the face 110 on the display(s) 156A, 156B. The scaled image may have a size, for example, inversely proportional to the determined distance of the face 110 from the camera 104, so that the scaled image will be smaller if the face 110 is determined to be farther from the camera 104 and larger if the face 110 is determined to be closer to the camera 104. The scaled image may have a size (when measured as a proportion of the total size of the display 156A, 156B), for example, inversely proportional to the determined size of the display(s) 156A, 156B, so that the scaled image occupies a smaller proportion of a larger display and a larger proportion of a smaller display, so that the absolute size of the displayed image is the same regardless of the size of the display(s) 156A, 156B.

In some example implementations, the computer system performing the scaling can determine the distance 114 of the person's 108 face 110 from the camera 104 based on an interpupillary distance. The interpupillary distance can be a distance between pupils, and/or midpoints, of the eyes of the person's 108 face 110. Interpupillary distances tend to be approximately the same for different persons, such as approximately sixty-five millimeters (65 mm). The distance 114 can be determined by determining the interpupillary distance, and/or a width between the eyes on the person's 108 face 110, and dividing a predetermined distance or predetermined width by the interpupillary distance and/or width to determine a distance ratio and/or width ratio. The distance 114 of the face 110 from the camera 104 can be determined by multiplying the distance ratio and/or width ratio by a predetermined distance. In some examples, the computer system can determine the distance ratio and/or width ratio by dividing the interpupillary distance and/or width by the predetermined distance or predetermined width, and determine the distance 114 by dividing the predetermined distance by the distance ratio and/or width ratio.

In some example implementations, the computer system performing the scaling can determine the distance based on a height from a mouth midpoint to an inter-eye midpoint. The height from the mouth midpoint to the inter-eye midpoint tends to be approximately the same as the interpupillary distance and/or the same for different persons, such as approximately sixty-five millimeters (65 mm). The computer system can measure the height from the mouth midpoint to the inter-eye midpoint within the captured image and divide a predetermined height by the measured height to determine a height ratio. The computer system can determine the distance 114 by multiplying a predetermined distance by the height ratio. In some examples, the computer system can determine the height ratio by dividing the measured height by the predetermined height, and determine the distance 114 by dividing the predetermined distance by the height ratio.

In some examples, the face 110 may be facing away from the camera 104, such as to the side, up, or down with respect to the camera 104, rather than directly toward the camera 104. The facing away can reduce the interpupillary distance and/or height in the captured image. The interpupillary distance and/or height in the captured image can be, for example, a function of a cosine of an angle by which the face 110 is facing away from the camera 104. In some examples, the computer system can select a greater of the interpupillary distance and/or width, or the height from the midpoint of the mouth to the midpoint of the eyes. In some examples, the computer system can divide a predetermined value, such as a predetermined width, distance, or height, by the selected value to determine a ratio, and multiply the ratio by a predetermined distance to determine the distance 114. In some examples, the computer system can divide the selected value by the predetermined value, such as the predetermined width, distance, or height, to determine the ratio, and divide the predetermined distance by the ratio to determine the distance 114. In some examples, if no interpupillary distance is available, such as because the person is facing too far away from the camera 104, the computer system can rely on a recent determination of distance.

In examples in which the scaling is performed by the camera 104 and/or a computer system controlling the camera 104, the camera 104 and/or computer system controlling the camera 104 can determine the size(s) 166A, 166B of the display(s) 156A, 156B based on a message or indication received from the display(s) 156A, 156B, such as a display size indicator included in a Hypertext Transfer Protocol (HTTP) message received from the display(s) 156A, 156B and/or a computing device or computing system associated with or controlling the display(s) 156A, 156B. In examples in which the scaling is performed by a computer system such as one or more servers facilitating the video conference, the computer system can determine the size(s) 166A, 166B of the display(s) 156A, 156B based on a message or indication received from the display(s) 156A, 156B, such as a display size indicator included in a Hypertext Transfer Protocol (HTTP) message received from the display(s) 156A, 156B and/or a computing device or computing system associated with or controlling the display(s) 156A, 156B. In examples in which the scaling is performed by the display(s) 156A, 156B and/or a computer system associated with and/or controlling the display(s) 156A, 156B, the display(s) 156A, 156B can determine the size(s) 166A, 166B based a value stored in memory of the display(s) 156A, 156B.

In some examples, the computer system can recognize the person's 108 face 110 as an active speaker during the video conference. Based on, and/or in response to, recognizing the person's 108 face 110 as the active speaker, the computer system can scale the captured image of the person's 108 face 110, crop the captured image to remove portions that do not include the person's 108 face 110, and/or move and/or present the portion of the captured image that includes the person's 108 face 110 in a center of a generated image and/or the display 156A, 156B.

To facilitate scaling the person's 108 face 110, and/or as a precondition or trigger for scaling the person's 108 face 110, the computer system can determine which person 108, 112 is the active speaker, and/or recognize the person 108 and/or person's 108 face 110 as the active speaker in the videoconference. In some examples, the computer system can determine that the person 108 is the active speaker and/or recognize the person's 108 face 110 as the active speaker based on a time difference between multiple audio inputs indicating that a distance and/or location of the person 108 (who may be considered the active speaker) matches a determined location of the person 108 and/or person's 108 face 110. In some examples, the location of the person 108 and/or person's 108 face can be determined based on the determined distance of the person 108 and/or person's 108 face 110 and a direction of the person 108 and/or person's 108 face from the camera 104.

In some examples, the computer system can recognize the person 108 and/or person's 108 face 110 as the active speaker based on recognizing lip movement on the person 108 and/or the person's 108 face 110. In some examples, the computer system can recognize the person 108 and/or person's 108 face 110 as the active speaker based on recognizing facial deformations over time. In some examples, facial deformations can include changes to the appearance of parts of the face, including eyes, cheeks, chin, and/or forehead. In some examples, the computer system can recognize the person 108 and/or person's 108 face 110 as the active speaker based on recognizing eye gazes and/or facial deformations of other person(s) toward the person 108 and/or person's 108 face 110. In some examples, the person(s) whose eye gazes are recognized as being directed toward the person 108 and/or person's 108 face 110 can be one or more persons 112 in the same room 102 as the person 108 and/or person's 108 face 110 who is the active speaker and the image of whose face and/or eyes is captured by the same camera 104 as the person 108 and/or person's 108 face 110. In some examples, the person(s) whose eye gazes are recognized as being directed toward the person 108 and/or person's 108 face 110 can be one or more persons 162A, 162B in one or more different rooms 152A, 152B whose gazes toward images of the person 108 and/or person's 108 face 110 on the display(s) 156A, 156B are captured by different camera(s) 154A, 154B than the camera 104 that captured the image of the person 108 and/or person's 108 face 110 who is the active speaker.

In some examples, the computer system can recognize the persons 108, 112, 162A, 162B as persons and/or participants in the video conference based on a combination of one, two, three, or four of recognizing faces in captured images, recognizing body shapes without faces in the captured images (such as a person who is facing away from the camera 104, 154A, 154B), recognizing lip movement and/or facial deformations in the captured images, and/or recognizing gazes toward the captured image of the person 108, 112, 162A, 162B to be recognized as a person and/or participant in the video conference.

Figure 2:
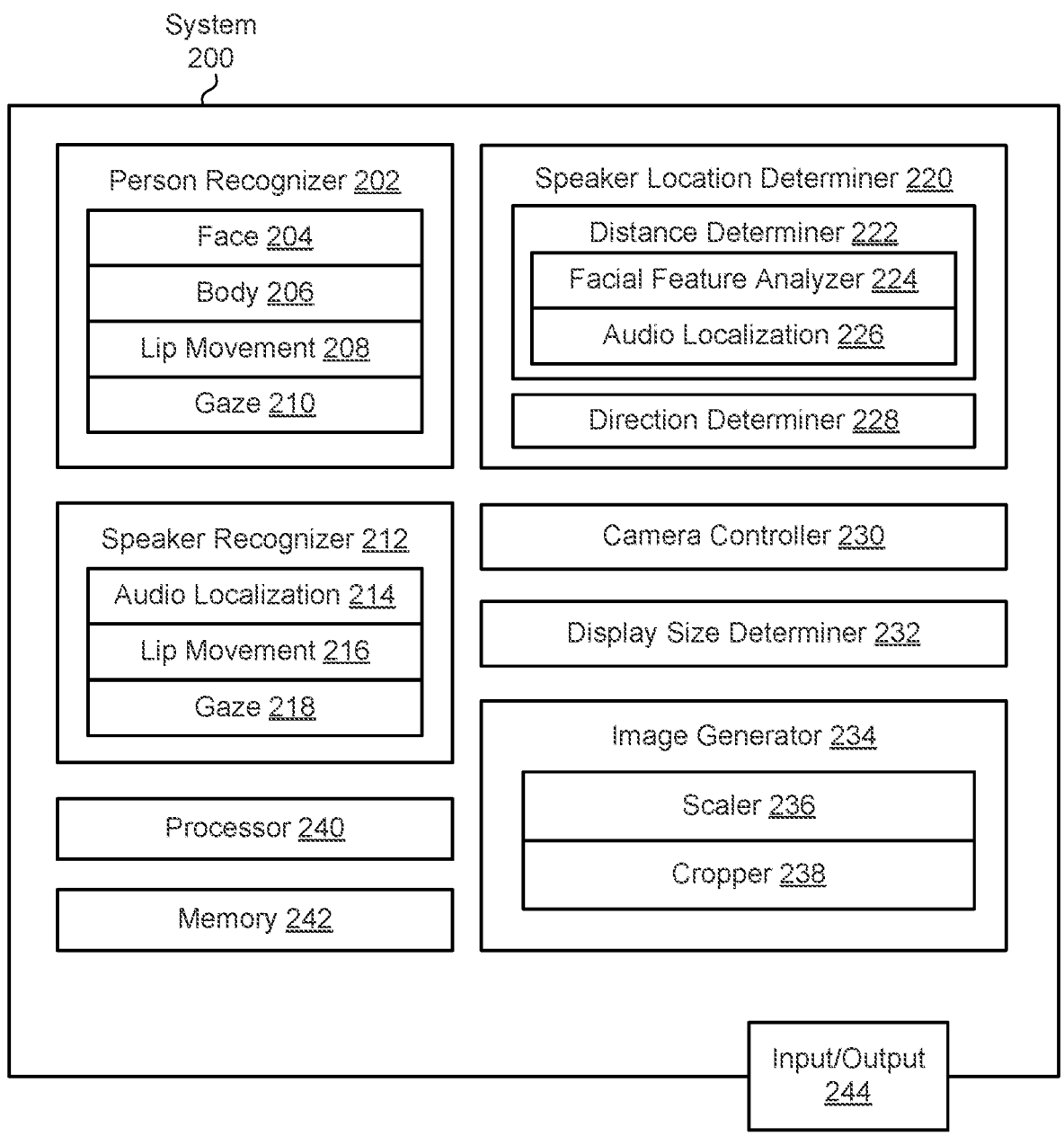
FIG. 2 is a block diagram of a system for scaling an image of a speaker's face according to an example implementation.

FIG. 2 is a block diagram of a system 200 for scaling an image of a speaker's face 110 according to an example implementation. In some examples, the system 200 can be included in the camera 104 and/or a computer system associated with and/or controlling the camera 104. In some examples, the system 200 can be included in a computer system such as one or more servers in communication with the cameras 104, 154A, 154B and/or displays 106, 156A, 156B that facilitates the videoconference. In some examples, the system 200 can be included in one or more of the displays 156A, 156B and/or a computer system associated with and/or controlling one or more of the displays 156A, 156B.

The system 200 can include a person recognizer 202. The person recognizer 202 can recognize images of humans and/or persons captured by the camera(s) 104, 154A, 154B as persons and/or participants in the video conference. The person recognizer 202 can recognize the images as persons and/or participants in the video conference based on indications of, classifications as, and/or signals indicating that, the images and/or portions thereof include faces, bodies, lip movement and/or facial deformations, and/or indications of gazes toward the person and/or participant.

The person recognizer 202 can include a face recognizer 204. The face recognizer 204 can recognize captured images, and/or portions of captured images, as faces and/or human faces. The face recognizer 204 can recognize faces and/or human faces based on recognizing shapes or outlines of faces and/or features of faces, such as one or more of eyebrow(s), eye(s) nose, cheeks, lip(s) and/or chin.

The person recognizer 202 can include a body recognizer 206. The body recognizer 206 can recognize captured images, and/or portions of captured images, as human bodies. The body recognizer 206 can recognize bodies based on shapes, such as the shape of a head, neck, shoulders, and/or bust, included in captured images.

The person recognizer 202 can include a lip movement recognizer 208. The lip movement recognizer 208 can recognize captured images, and/or portions of captured images, as including lip movement. The lip movement recognizer 208 can recognize the lip movement based on shapes included in the captured images matching and/or being similar to shapes of lips, and based on vertical movement and/or bending of portions of the lips. In some examples, the lip movement recognizer 208 can additionally or alternatively function as a facial deformation recognizer.

The facial deformation recognizer can recognize facial deformations over time, such as changes in appearance of portions of a person's face, including the person's lips, cheeks, chin, and/or forehead, and recognize activities by the person based on the facial deformation, such as actively speaking or gazing at an active speaker. The facial deformation recognizer can recognize the activities based on the facial deformations over time using heuristics and/or rules, using a trained model such as a linear regression model or non-linear regression model, or using one or more neural networks.

The person recognizer 202 can include a gaze determiner 210. The gaze determiner 210 can determine the direction of gazes and/or of eyes to determine whether the gazes and/or eyes are pointing toward a potential person. The gaze determiner 210 can recognize eyes, irises, and/or pupils in captured images, and determine a direction that the eyes, irises, and/or pupils are pointing. In some examples, the gaze determiner 210 can determine that the eyes, irises, and/or pupils are pointing toward an object, which may be a potential person, in a same room 102, 152A, 152B as the eyes, irises, and/or pupils, in which examples the person 108 may be in the same room as the eyes, irises, and/or pupils. In some examples, the gaze determiner 210 can determine that the eyes, irises, and/or pupils are pointing toward an object, which may be a potential person, which is displayed and/or presented by the display 156A, 156B, in which examples the person 108 may be the object presented on the display 156A, 156B and which was included in the image captured by the camera 104.

The person recognizer 202 can determine that an object included in an image captured by the camera 104 is a person based on a combination of the determinations and/or recognitions by the face recognizer 204, body recognizer 206, lip movement recognizer 208 and/or facial deformation recognizer, and/or gaze determiner 210. In some examples, the person recognizer 202 can determine that the object is a person based on at least two of the face recognizer 204, body recognizer 206, lip movement recognizer 208 and/or facial deformation recognizer, and/or gaze determiner 210 having a threshold confidence level that the object is a person (the threshold confidence level may be the same or different for each of the face recognizer 204, body recognizer 206, lip movement recognizer 208 and/or facial deformation recognizer, and/or gaze determiner 210), based on at least three of the face recognizer 204, body recognizer 206, lip movement recognizer 208 and/or facial deformation recognizer, and/or gaze determiner 210 having a threshold confidence level that the object is a person (the threshold confidence level may be the same or different for each of the face recognizer 204, body recognizer 206, lip movement recognizer 208 and/or facial deformation recognizer, and/or gaze determiner 210), and/or based on all four of the face recognizer 204, body recognizer 206, lip movement recognizer 208 and/or facial deformation recognizer, and/or gaze determiner 210 having a threshold confidence level that the object is a person (the threshold confidence level may be the same or different for each of the face recognizer 204, body recognizer 206, lip movement recognizer 208 and/or facial deformation recognizer, and/or gaze determiner 210). A confidence level may be a likelihood, expressed as a percentage or a fraction of a number such as one, of a proposition, such as an object being a person and/or an active speaker, being true for given inputs and/or signals. The inputs and/or signals may include video and/or photograph data, and/or audio data, according to some examples.

In some examples, the person recognizer 202 can determine that an object is a person based on a variable number of signals indicating a threshold confidence level that the object is a person. The number can vary based on a number of candidate persons in the room 102. In some examples, if a predetermined number, such as one or two, of the face recognizer 204, body recognizer 206, lip movement recognizer 208 and/or facial deformation recognizer, and/or gaze determiner 210, determine that a lower number of objects are candidate persons by determining that the objects may be persons with a lower confidence level, then the person recognizer 202 may determine whether an object is a person based on a lower number, such as one or two, of the face recognizer 204, body recognizer 206, lip movement recognizer 208 and/or facial deformation recognizer, and/or gaze determiner 210, determining that the object is a person with a higher confidence level, whereas if the predetermined number, such as one or two, of the face recognizer 204, body recognizer 206, lip movement recognizer 208 and/or facial deformation recognizer, and/or gaze determiner 210, determine that a higher number of objects are candidate persons by determining that the objects may be persons with the lower confidence level, then the person recognizer 202 may determine whether an object is a person based on a higher number, such as three or four, of the face recognizer 204, body recognizer 206, lip movement recognizer 208 and/or facial deformation recognizer, and/or gaze determiner 210, determining that the object is a person with a higher confidence level.

For example, if one or two of the face recognizer 204, body recognizer 206, lip movement recognizer 208 and/or facial deformation recognizer, and/or gaze determiner 210 determine that a lower number such as only one or two objects in the room 102 are persons with the lower confidence level such as fifty percent (50%), then the person recognizer 202 can determine whether the one or two objects are persons based on the lower number such as one or two of the face recognizer 204, body recognizer 206, lip movement recognizer 208 and/or facial deformation recognizer, and/or gaze determiner 210, determining that the objects are persons with the greater confidence level such as eighty percent (80%). If one or two of the face recognizer 204, body recognizer 206, lip movement recognizer 208 and/or facial deformation recognizer, and/or gaze determiner 210 determine that a greater number such as three or more objects in the room 102 are persons with the lower confidence level such as fifty percent (50%), then the person recognizer 202 can determine whether the one or two objects are persons based on the higher number such as three or four of the face recognizer 204, body recognizer 206, lip movement recognizer 208 and/or facial deformation recognizer, and/or gaze determiner 210 determining that the objects are persons with the greater confidence level such as eighty percent (80%).

The objects included in the images captured by the camera 104 may be candidates to be considered an active speaker. The system 200 can perform the scaling on the face 110 of the person 108 that the system 200 determines to be the active speaker, and/or other persons 112 in the same room 102 as the active speaker.

The system 200 can include a speaker recognizer 212. The speaker recognizer 212 can recognize a person recognized by the person recognizer 202 as an active speaker. The speaker recognizer 212 can recognize an active speaker by determining whether each of the persons recognized by the person recognizer 202 is an active speaker based on audio localization, lip movement and/or facial deformation of the recognized person, and/or gaze detection of other recognized persons.

The speaker recognizer 212 can include an audio localization engine 214. The audio localization engine 214 can perform audio localization based on recognized speech received by multiple, such as at least two, microphones or other audio input devices in an input array such as a linear microphone array. The audio localization engine 214 can determine possible locations, which can include combinations of distance and/or direction, of an active speaker, and/or more than one active speaker, the possible locations forming an arc extending away from the microphones, based on time differences of when the microphones received the same speech and a known speed of sound. The speaker recognizer 212 can compare the possible locations determined by the audio localization engine 214 to a location determined by a speaker location determiner 220 to determine whether a person is the active speaker.

The speaker recognizer 212 can include a lip movement recognizer 216. The lip movement recognizer 216 can recognize lip movement of persons 108, 112, such as the speaker, in the room 102. The lip movement recognizer 216 can recognize the person's 108 face 110, and/or recognize lips within the face 110. The lip movement recognizer 216 can recognize movement of the recognized lips. Based on the recognition of lip movement within a face 110 of the person 108, the speaker recognizer 212 can determine that the person 108 is an active speaker. In some examples, the lip movement recognizer 216 can also function as a facial deformation recognizer, similar to the lip movement recognizer 208 described above.

The speaker recognizer 212 can include a gaze determiner 218. The gaze determiner 218 can determine directions of gazes of persons 108, 112, 162A, 162B in the videoconference, and/or determine persons 108, 112, 162A, 162B toward whom gazes of persons 108, 112, 162A, 162B in the videoconference are directed. The gaze determiner 218 can recognize eyes and/or pupils within faces of persons 108, 112, 162A, 162B, and determine directions of gazes such as by determining directions of pupils within the eyes. The speaker recognizer 212 can determine that a speaker is a person 108, 112, 162A, 162B toward whom the gazes of other persons 108, 112, 162A, 162B are directed.

The speaker recognizer 212 can determine and/or recognize an active speaker based on a combination of inputs from the audio localization engine 214, lip movement recognizer 216 and/or facial deformation recognizer, and/or gaze determiner 218. In some examples, the speaker recognizer 212 can determine and/or recognize the active speaker based on a minimum number, such as at least one, at least two, or all three, of the audio localization engine 214, lip movement recognizer 216 and/or facial deformation recognizer, and/or gaze determiner 218 meeting a threshold confidence level for recognizing and/or determining that a person 108, 112, 162A, 162B is the active speaker. Confidence levels can be values, such as percentages or fractions of one, that represent a likelihood of a proposition being true based on given or available inputs and/or signals, such as the likelihood that a person 108, 112, 162A, 162B is the active speaker. In some examples, the speaker recognizer 212 can determine and/or recognize the active speaker based on a sum of confidence levels of the audio localization engine 214, lip movement recognizer 216 and/or facial deformation recognizer, and/or gaze determiner 218 meeting a threshold confidence level for recognizing and/or determining that a person 108, 112, 162A, 162B is the active speaker.

The system 200 can include a speaker location determiner 220. The speaker location determiner 220 can determine a location of an active speaker, such as a distance and/or direction from the camera 104, when and/or after the active speaker has been recognized by the speaker recognizer 212. The system 200 can turn and/or focus the camera 104 on the active speaker based on the determined location of the active speaker, and/or the system 200 can increase or decrease the size of an image based on the determined distance. The speaker location determiner 220 can include a distance determiner 222 and/or a direction determiner 228.

The distance determiner 222 can determine a distance of the person 108 and/or active speaker from the camera 104. The distance determiner 222 can determine the distance of the person 108 by analyzing facial features, such as the dimensions between parts of the person's 108 face 110, and/or by audio localization based on audio inputs from multiple inputs such as microphones.

The facial feature analyzer 224 can recognize and analyze features of a person's 108 face 110, and/or parts of the person's 108 face 110. In some examples, the facial feature analyzer 224 can determine locations of midpoints and/or centers of the person's 108 eyes, and/or determine locations of the person's 108 pupils, and determine a distance between the midpoints and/or pupils. In some examples, the facial feature analyzer 224 can determine a center point between the person's 108 eyes and a midpoint of the person's 108 mouth, and determine a distance between the center point between the eyes and the midpoint of the mouth. These determinations and/or analyses are shown and described in greater detail with respect to FIG. 3A.

The audio localization engine 226 can determine a distance of the person 108 from the camera 104 based on audio inputs from multiple sources at different locations. The audio localization engine 226 can determine possible distances and/or locations of the person 108 based on time differences in receiving same and/or similar audio speech input and locations of the multiple sources (examples of the sources are microphones). An example of some of the data based upon which the audio localization engine performs audio localization is shown and described in greater detail with respect to FIG. 4.

The system 200 can include a camera controller 230. The camera controller 230 can control the direction that the camera 104 points and/or from which the camera 104 captures images, and/or a focus and/or zoom level of the camera 104. The camera 230 can control the direction, focus, and/or zoom level based on the location of the speaker as determined by the speaker location determiner 220, so that the speaker's face and/or bust are captured by the camera 104. In some examples, the camera controller 230 can cause the camera 104 to point in a direction so that the camera 104 captures the speaker and one or more persons 112 in the same room 102 as the speaker, to enable creating an image with multiple persons 108, 112.

In some examples, the camera controller 230 can be controlled remotely, such as by a person 108, 112 in the same room 102 as the camera 104 controlling the camera controller 230, and/or a person 162A, 162B in the same room 152A, 152B as the display 156A, 156B presenting the image(s) captured by the camera 104. The camera controller 230 can be controlled remotely by a hand-held controller through a touch-screen on the display 106, 156A, 156B, or through a separate touchscreen display, according to some examples. The person 108, 112 can control the direction, such as pan and/or tilt, and/or zoom level of the camera 104. In some examples, the camera controller 230 can present zoom suggestions to a person remotely controlling the camera 104, such as a suggestion to select a zoom level that will make a presented image of the person 108 appear life-size and/or lifelike, a zoom level that creates a broad picture that will show all persons 108, 112 in the room 102, and/or a zoom level that causes the image of the person's 108 face 110 and/or other selected body parts such as the person's 108 bust or portrait image to fill the entire display 156A, 156B. The camera controller 230 could include rules and/or heuristics to prevent a person 108, 112 remotely controlling the camera 104 from focusing the camera 104 on undesired locations, such as inappropriate body parts. The inappropriate body parts could be recognized and/or excluded by the person recognizer 202 and/or body recognizer 206.

The system 200 can include a display size determiner 232. The display size determiner 232 can determine the size of the display 156A, 156B upon which an image displaying the speaker's face 110, and/or faces of any other persons 112, will be displayed. In some examples, the image can be scaled based on the determined size of the display 156A, 156B. If the display 156A, 156B is smaller, then the image can occupy a larger proportion of the display 156A, 156B, whereas if the display 156A, 156B is larger, then the image can occupy a smaller proportion of the display 156A, 156B, so that the display 156A, 156B presents a life-size image of the face. In an example in which a computing system associated with camera 104 that captures the image of the face(s) 110 performs the scaling of the image, the display size determiner 232 can determine the size of the display 156A, 156B based on a message received from the display 156A, 156B and/or a computing system associated with the display 156A, 156B, such as a Hypertext Transfer Protocol (HTTP) message and/or a Web Real-Time Communications (WebRTC) message. In an example in which a computing system associated with the display 156A, 156B performs the scaling of the image, the display size determiner 232 can determine the size of the display 156A, 156B by retrieving an indicator of the size from memory stored in the display 156A, 156B and/or the computing system associated with the display 156A, 156B.

The computing system 200 can include an image generator 234. The image generator 234 can generate an image for presentation on the display 156A, 156B. The generated image can include a face(s) 110 of one or more persons 108, 112, 162A, 162B in the rooms 102, 152A, 152B participating in the videoconference. The image generator 234 can scale the images to make the images appear life-size, crop the images so that the faces 110 fit on the display 106, 156A, 156B and/or so that more than one face can be displayed at life size on the display 106, 156A, 156B, and/or include a smaller image of the image captured by the camera 104, 154A, 154B that is in the same room 102, 152A, 152B as the display 106, 156A, 156B.

The image generator 234 can include a scaler 236. The scaler 236 can scale images, and/or cropped portions of images for inclusion in the image that is generated for presentation on the display 156A, 156B. The scaler 236 can scale the images based on the determined distance of the person 108, 112 and/or face 110, and/or based on the determined size of the display 156A, 156B, so that the images of the faces 110 and/or busts appear life-size, as if the persons 162A, 162B looking at the images presented by the displays 156A, 156B are looking at the person(s) 108, 112 through a window and the person(s) 108, 112 are the same distance on an opposite side of the display 156A, 156B from the person(s) 162A, 162B as the person(s) 108, 112 are from the display 106. In some examples, the scaler 236 can delay changes to the scaling so that the image does not appear jerky, which could occur if the scaler 236 caused the image to zoom in and out. In some examples, the scaler 236 can scale the images to ensure "padding," or non-person images and/or portions of the captured image that the person recognizer 202 does not recognize as including any portion of a person, exist on the left, right, and/or top of the display 156A, 156B. The padding or non-person image can be specified in a number of pixels, inches or fractions thereof, centimeters, millimeters, or other quantifiable distances.

The image generator 234 can include a cropper 238. The cropper 238 can crop the captured image, eliminating and/or reducing portions of the captured image, such as any combination of a left portion of the captured image, a right portion of the captured image, a top portion of the captured image, and/or a bottom portion of the captured image. Cropping the captured image can enable the image generator to scale the captured image by increasing the size of the image, and/or include captured images of more than one face 110 and/or person 108, 112 in the generated image.

The system 200 can include at least one processor 240. The at least one processor 240 can include one or more microprocessors and/or controllers that execute instructions. The at least one processor 240 can execute instructions to cause the system 200 to perform any combination of functions, methods, and/or techniques described herein with respect to the system 200, camera(s) 104, 154A, 154B and/or computing system(s) associated with and/or controlling the camera(s) 104, 154A, 154B, and/or display(s) 106, 156A, 156B and/or computing system associated with and/or controlling the display(s) 106, 156A, 156B.

The system 200 can include at least one memory device 242. The at least one memory device 242 can include a non-transitory computer-readable storage medium storing data and/or instructions. The data can include data generated and/or relied upon or accessed during, as a predicate for, and/or as a result of, any combination of functions, methods, and/or techniques described herein. The instructions can include instructions that, when executed by the at least one processor 240, cause the system 200 to perform any combination of functions, methods, and/or techniques described herein with respect to the system 200, camera(s) 104, 154A, 154B and/or computing system(s) associated with and/or controlling the camera(s) 104, 154A, 154B, and/or display(s) 106, 156A, 156B and/or computing system associated with and/or controlling the display(s) 106, 156A, 156B.

The system 200 can include at least one input/output module 244. The at least one input/output module 244 can include any combination of input and/or output devices, such as one or more cameras 104, 154A, 154B (which may be videocameras), one or more microphones 408A, 408B (shown in FIG. 4), one or more displays 106, 156A, 156B, one or more human interface devices (HIDs) such a keyboard, computer mouse, or touchscreen, and/or networking and/or communication interfaces including wired interfaces (such as Ethernet (Institute for Electrical and Electronics Engineers (IEEE) 802.3), Universal Serial Bus (USB), coaxial cable, and/or High Definition Multiple Input (HDMI)), and/or wireless interfaces (such as Wireless Fidelity (IEEE 802.11)), Bluetooth (IEEE 802.15), and/or a cellular network protocol such as Long-Term Evolution (LTE) and/or LTE-Advanced), as non-limiting examples.

Figure 3A:
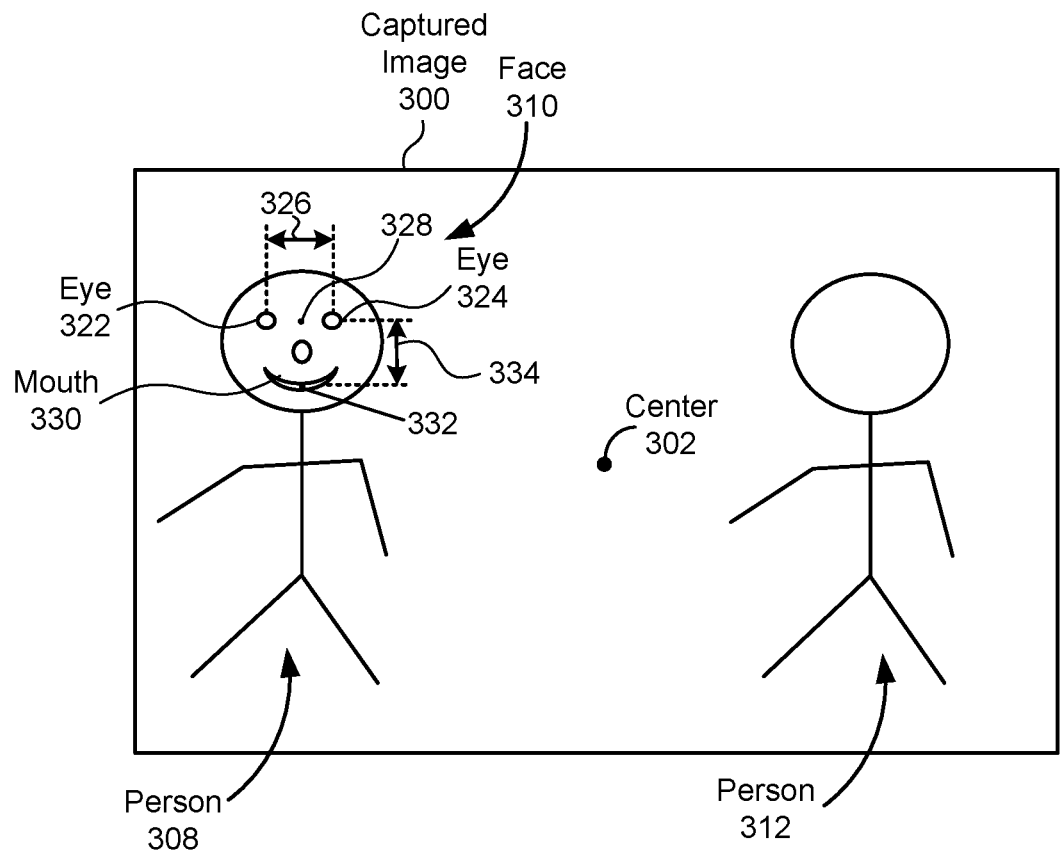
FIG. 3A is a diagram of a captured image that includes images of two persons according to an example implementation.

FIG. 3A is a diagram of a captured image 300 that includes images of two persons 308, 312 according to an example implementation. In some examples, the captured image 300 can be an image captured by the camera 104, and the persons 308, 312 correspond to the persons 108, 112 in the room 102 shown in FIG. 1. A center 302 of the captured image 300 can be a reference point for determining angles and/or directions of objects in the captured image 300.

The system 200 can recognize, in at least one of the persons 308 in the captured image 300, a face 310. Within the face 310, the system can recognize body parts such as eyes 322, 324, and a mouth 330.

In some examples, the system 200 can recognize a distance 326 between the eyes 322, 324. The system 200 can recognize and/or determine the distance 326 between midpoints of the eyes, between pupils of the eyes (which can be considered an interpupillary distance), and/or between closest points of the eyes.

In some examples, the system 200 can recognize a midpoint 328 of the eyes 322, 324 and a midpoint 332 of the mouth 330. The system 200 can recognize and/or determine a distance 334 between the midpoint 328 of the eyes 322, 324 and the midpoint 332 of the mouth 330.

The distance determiner 222 can determine the distance of the face 310 from the camera 104 based on the interpupillary distance 326 and/or the distance 334 between the midpoint 328 of the eyes 322, 324 and the midpoint 332 of the mouth 330. The distance determiner 222 can compensate for the reduction in either distance 326, 334 caused by the face 310 turning away from, and/or not facing directly, the camera 104, by determining the distance of the face 310 from the camera 104 based on the greater of the interpupillary distance 326, and the distance 334 between the midpoint 328 of the eyes 322, 324 and the midpoint 332 of the mouth 330.

Figure 3B:
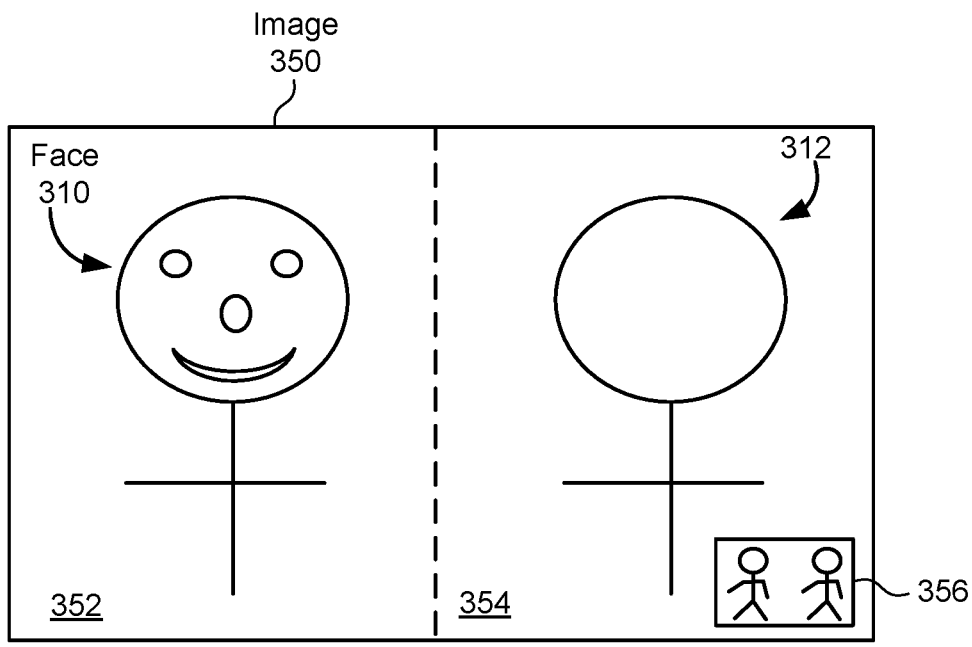
FIG. 3B is a diagram of an image presented after scaling a person's face according to an example implementation.

FIG. 3B is a diagram of an image 350 presented after scaling a person's face 310 according to an example implementation. In this example, the scaler 236 may have scaled the portion of the captured image 300 that included the face 310, based on the determined distance(s) 326, 334, so that the face 310 in the image 350 appears life-size on the display 156A, 156B (not shown in FIG. 3B). The cropper 238 may have cropped the captured image 300 to present the face 310 at life-size scale. In the example shown in FIG. 3B, an image 350 generated by the image generator 234 includes a cropped image of the face 310 in a first portion 352 or left portion of the image 350, and a cropped image of a face of a second person 312 (who may correspond to the second person 112 in the room 102) in a second portion 354 or right portion of the image 350.

The image 350 generated by the image generator 234 may also include a thumbnail image 356 of the captured image 300 and/or an image of the full room 102. The thumbnail image 356 can be an image of the entire captured image 300 that occupies a fraction, such as one-tenth, of the generated image 350. In some examples, the system 200 can send the thumbnail image 356 as a separate, lower-resolution image from the remaining image 350. Sending the thumbnail image 356 as a separate, lower-resolution image from the remaining image 350 can reduce the data required to send the image 350 and thumbnail image 356 compared to sending the image 350 including the thumbnail image 356 as a single image or as two images with the same resolution as the captured image 350.

Figure 4:
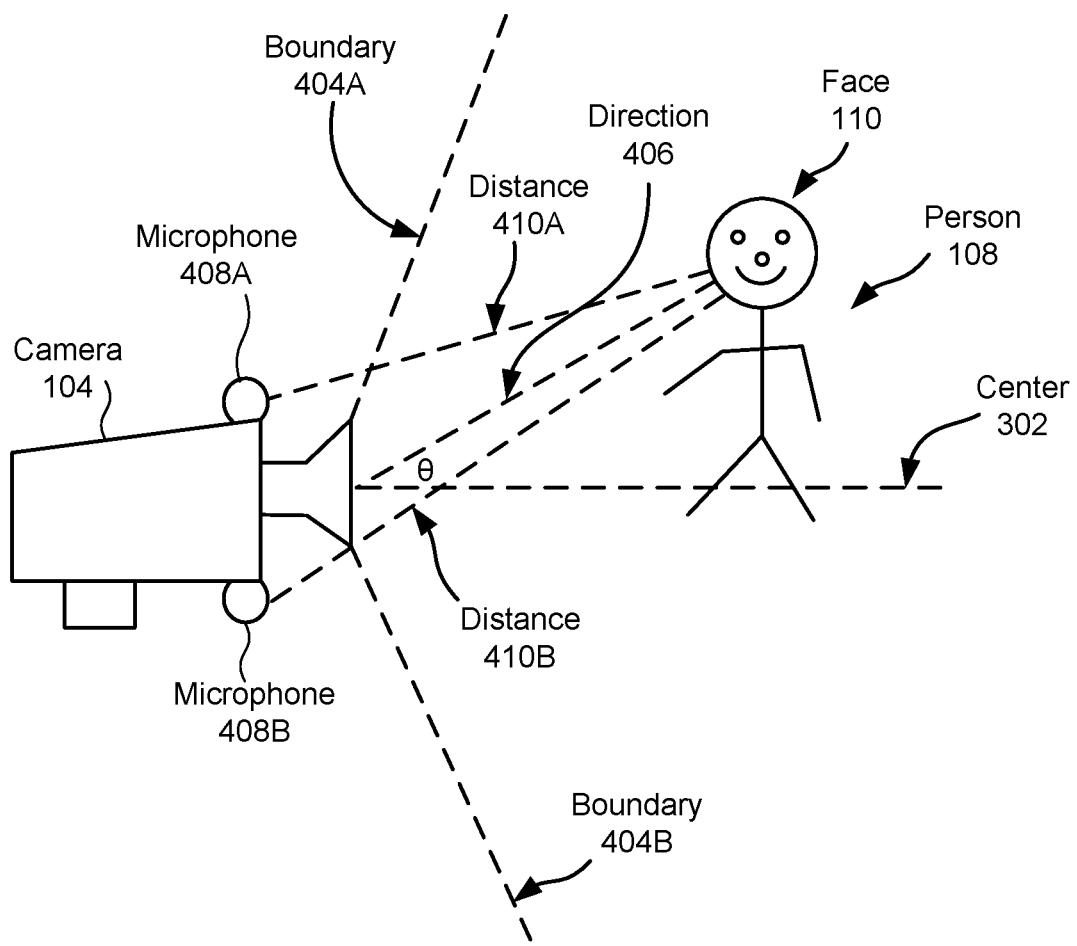
FIG. 4 is a diagram showing dimensions between the person and the camera according to an example implementation.

FIG. 4 is a diagram showing dimensions between the person 108 and the camera 104 according to an example implementation. The camera 104 may have a wide angle, capturing images of objects within boundaries 404A, 404B that are less than ninety degrees) (90°) from the center 302 of the image 300 captured by the camera 104. A direction 406 of a person's 108 face 110 may be measured as an angle θ from the center 302 of the captured image 300. The direction 406 may be determined based on a location of the face 110 within the captured image 300. The system 200 may determine the angle θ based on a location of the face 110 within the captured image 300, and/or based on an offset of the face 110 from the center 302 of the captured image 300.

The camera 104, and/or a computing device associated with and/or controlling the camera 104, can include multiple microphones 408A, 408B. While two microphones 408A, 408B are shown in FIG. 4, the camera 104 and/or computing device can include any number of microphones 408A, 408B. The microphones 408A, 408B can be at diverse and/or different locations. The diverse and/or different locations of the microphones 408A, 408B can cause distances 410A, 410B from the respective microphones 408A, 408B to the face 110 (where spoken words will originate) to be different from each other. The different distances 410A, 410B from the face 110 to the microphones 408A, 408B can cause the words spoken by the person 108, and/or the audio signals, to arrive at the microphones 408A, 408B at different times. The audio localization engine 226 of the speaker location determiner 220 can determine possible distances and/or locations of the face 110 based on the differences in times between the microphones 408A, 408B receiving and/or processing the words spoken by the person 108 and/or audio signals originating from the person 108.

Figure 5:
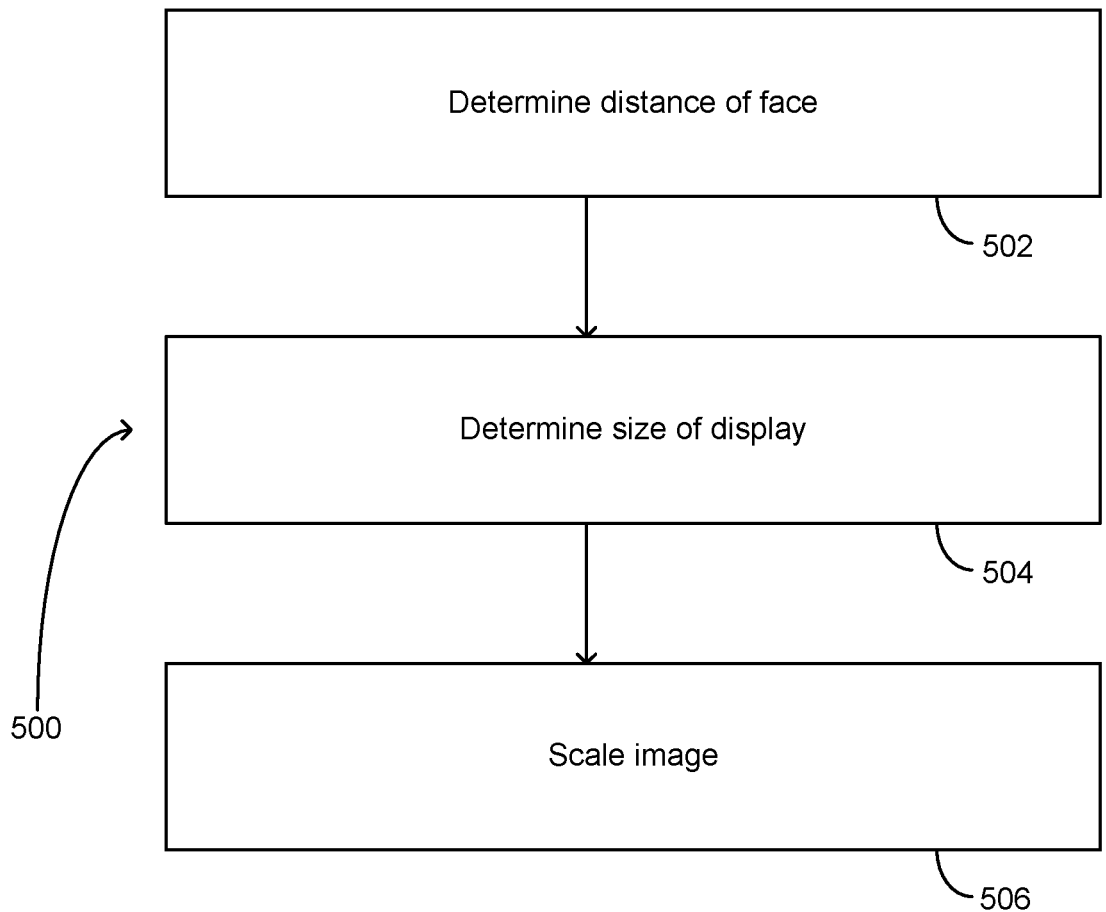
FIG. 5 is a flowchart showing a method according to an example implementation.

FIG. 5 is a flowchart showing a method 500 according to an example implementation. According to a first example, the method 500 may include determining a distance 114 of a person's face 110 from a camera 104 that captured an image 300 of the person's 108 face 110 (502), determining a size 166A, 166B of a display 156A, 156B in communication with the camera 104 (504), and scaling the image 350 based on the determined distance 114 of the person's 108 face 110 and the determined size 116A, 166B of the display (506).

According to a second example, the determining the distance of the person's face (502) may include recognizing a left eye and a right eye in the image of the person's face, measuring a width between the left eye and the right eye, dividing a predetermined width by the measured width to determine a width ratio, and multiplying the width ratio by a predetermined distance.

According to a third example, the determining the distance of the person's face (502) may include recognizing a left eye and a right eye in the image of the person's face, determining an inter-eye midpoint of the left eye and the right eye, recognizing a mouth in the image of the person's face, determining a mouth midpoint of the mouth, measuring a height from the mouth midpoint to the inter-eye midpoint, dividing a predetermined height by the measured height to determine a height ratio, and multiplying the height ratio by a predetermined distance.

According to a fourth example, the determining the distance of the person's face (502) may include measuring a width between a left eye and a right eye in the image of the person's face, measuring a height between an inter-eye midpoint and a mouth midpoint in the image of the person's face, dividing a greater of the width and the height by a predetermined width if the width is greater and by a predetermined height if the height is greater to generate a ratio, and multiplying the ratio by a predetermined distance.

According to a fifth example, in any of the first through fourth examples, the determining the size of the display (504) may include determining the size of the display based on a display size indicator included in a Hypertext Transfer Protocol (HTTP) message received from a computing device associated with the display.

According to a sixth example, in any of the first through fifth examples, the scaling the image (506) may include scaling the image to a size on the display that matches a size that the person's face would appear to a viewer at a location of the display from the determined distance of the person's face from the camera.

According to a seventh example, in any of the first through sixth examples, the method 500 may further include recognizing the person's face as an active speaker based on a time difference between audio inputs indicating that a location of the active speaker matches a determined location of the person's face.

According to a eighth example, in any of the first through seventh examples, the location of the person's face may be determined based on the determined distance of the person's face and a direction of the person's face from the camera.

According to a ninth example, in any of the first through eighth examples, the method 500 may further include recognizing the person's face as an active speaker based on recognizing lip movement of the person's face.

According to a tenth example, in any of the first through ninth examples, the method 500 may further include recognizing the person's face as an active speaker based on recognizing eye gazes of other persons toward the person's face.

According to a eleventh example, in any of the first through tenth examples, the method 500 may further include sending the scaled image to the display.

According to a twelfth example, in any of the first through eleventh examples, the method 500 may further include receiving the captured image from the camera.

According to a thirteenth example, in any of the first through twelfth examples, the method 500 may be performed by a computing system 200 that controls the display.

According to a thirteenth example, in any of the first through twelfth examples, the method 500 may be performed by a computing system 200 that controls the camera.

Figure 6:
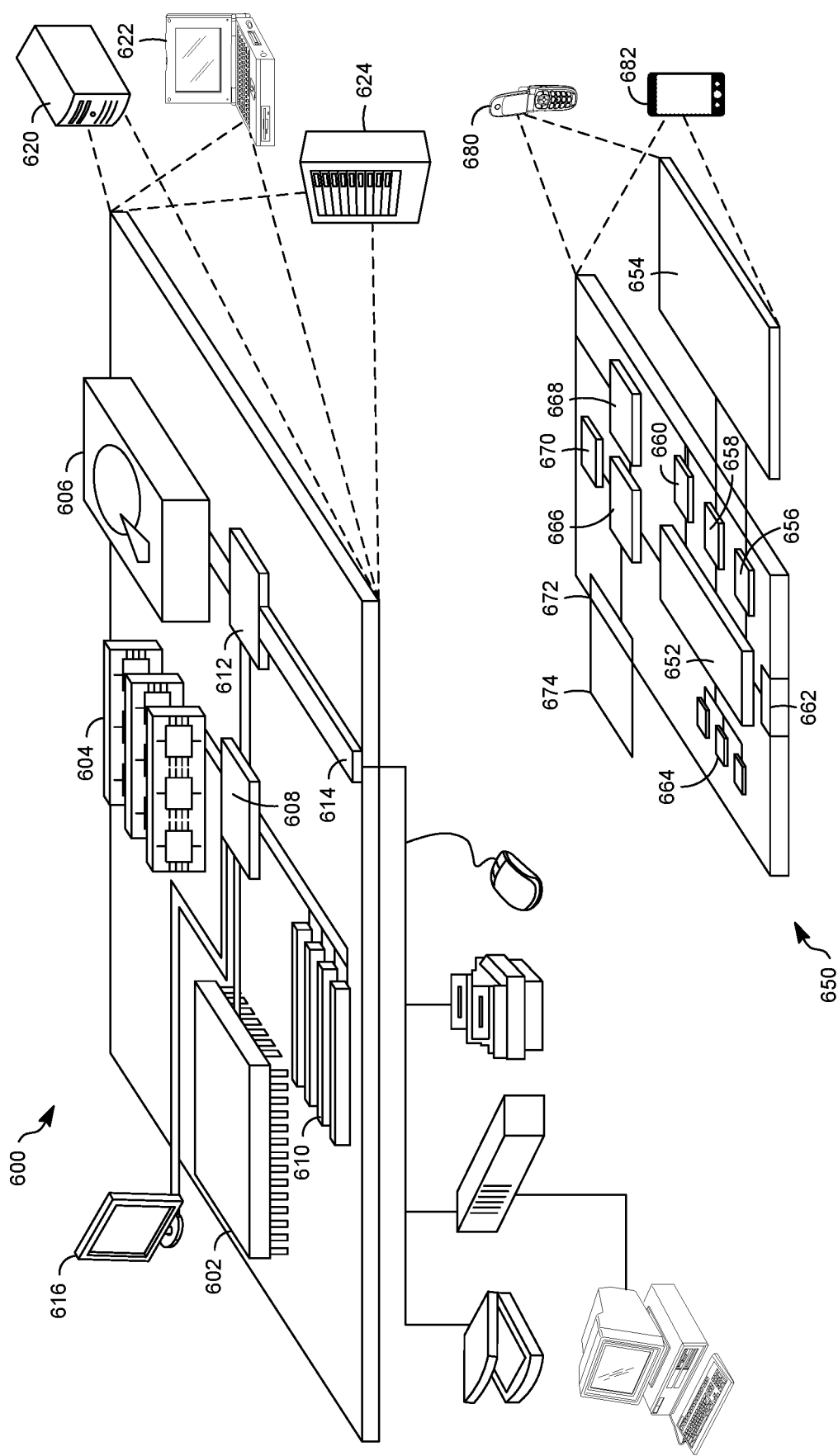
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided through the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of facilitating a video conference, the method comprising:
   determining a distance of a person's face from a camera that captured an image of the person's face, the determining the distance of the person's face from the camera including:
      measuring at least one of a width between a left eye and a right eye in the image of the person's face or a height from a mouth midpoint to an inter-eye midpoint in the image of the person's face;
      determining at least one of a width ratio by dividing a predetermined width by the measured width or a height ratio by dividing a predetermined height by the measured height; and
      multiplying at least one of the width ratio or the height ratio by a predetermined distance;
   determining a size of a display in communication with the camera, the display being in a different room than the camera; and
   scaling the image based on the determined distance of the person's face and the determined size of the display.

2. The method of claim 1, wherein the determining the distance of the person's face includes:
   recognizing the left eye and the right eye in the image of the person's face;
   measuring the width between the left eye and the right eye in the image of the person's face;
   dividing the predetermined width by the measured width to determine the width ratio; and
   multiplying the width ratio by the predetermined distance.

3. The method of claim 1, wherein the determining the distance of the person's face includes:
   recognizing the left eye and the right eye in the image of the person's face;
   determining the inter-eye midpoint of the left eye and the right eye;
   recognizing a mouth in the image of the person's face;
   determining the mouth midpoint of the mouth;
   measuring the height from the mouth midpoint to the inter-eye midpoint in the image of the person's face;
   dividing the predetermined height by the measured height to determine the height ratio; and
   multiplying the height ratio by the predetermined distance.

4. The method of claim 1, wherein the determining the distance of the person's face includes:
measuring the width between the left eye and the right eye in the image of the person's face;
measuring the height between the inter-eye midpoint and the mouth midpoint in the image of the person's face;
dividing a greater of the width and the height by the predetermined width if the width is greater and by the predetermined height if the height is greater to generate a ratio; and
multiplying the ratio by the predetermined distance.

5. The method of claim 1, wherein the determining the size of the display includes determining the size of the display based on a display size indicator included in a Hypertext Transfer Protocol (HTTP) message received from a computing device associated with the display.

6. The method of claim 1, wherein the scaling the image includes scaling the image to a size on the display that matches a size that the person's face would appear to a viewer at a location of the display from the determined distance of the person's face from the camera.

7. The method of claim 1, further comprising recognizing the person's face as an active speaker based on a time difference between audio inputs indicating that a location of the active speaker matches a determined location of the person's face.

8. The method of claim 7, wherein the location of the person's face is determined based on the determined distance of the person's face and a direction of the person's face from the camera.

9. The method of claim 1, further comprising recognizing the person's face as an active speaker based on recognizing lip movement of the person's face.

10. The method of claim 1, further comprising recognizing the person's face as an active speaker based on recognizing eye gazes of other persons toward the person's face.

11. The method of claim 1, further comprising sending the scaled image to the display.

12. The method of claim 1, further comprising receiving the captured image from the camera.

13. The method of claim 1, wherein the method is performed by a computing system that controls the display.

14. The method of claim 1, wherein the method is performed by a computing system that controls the camera.

15. A non-transitory computer-readable storage medium comprising instructions stored thereon for facilitating a video conference that, when executed by at least one processor, are configured to cause a computing system to at least:
determine a distance of a person's face from a camera that captured an image of the person's face, the determining the distance of the person's face from the camera including:
measuring at least one of a width between a left eye and a right eye in the image of the person's face or a height from a mouth midpoint to an inter-eye midpoint in the image of the person's face;
determining at least one of a width ratio by dividing a predetermined width by the measured width or a height ratio by dividing a predetermined height by the measured height; and
multiplying at least one of the width ratio or the height ratio by a predetermined distance;
determine a size of a display in communication with the camera; and
scale the image based on the determined distance of the person's face and the determined size of the display, the scaled image having a size inversely proportional to the determined distance of the person's face from the camera.

16. The non-transitory computer-readable storage medium of claim 15, wherein the determining the distance of the person's face includes:
recognizing the left eye and the right eye in the image of the person's face;
measuring the width between the left eye and the right eye in the image of the person's face;
dividing the predetermined width by the measured width to determine the width ratio; and
multiplying the width ratio by the predetermined distance.

17. The non-transitory computer-readable storage medium of claim 15, wherein the determining the distance of the person's face includes:
recognizing the left eye and the right eye in the image of the person's face;
determining the inter-eye midpoint of the left eye and the right eye;
recognizing a mouth in the image of the person's face;
determining the mouth midpoint of the mouth;
measuring the height from the mouth midpoint to the inter-eye midpoint in the image of the person's face;
dividing the predetermined height by the measured height to determine a height ratio; and
multiplying the height ratio by the predetermined distance.

18. The non-transitory computer-readable storage medium of claim 15, wherein the non-transitory computer-readable storage medium is stored on a computing system that controls the display.

19. The non-transitory computer-readable storage medium of claim 15, wherein the non-transitory computer-readable storage medium is stored on a computing system that controls the camera.

20. A system for facilitating a video conference, the system comprising:
a camera configured to capture images;
a display configured to present images;
at least one processor configured to execute instructions; and
a non-transitory computer-readable storage medium comprising instructions stored thereon that, when executed by the at least one processor, are configured to cause the system to at least:
determine a distance of a person's face from the camera that captured an image of the person's face, the determining the distance of the person's face from the camera including:
measuring at least one of a width between a left eye and a right eye in the image of the person's face or a height from a mouth midpoint to an inter-eye midpoint in the image of the person's face;
determining at least one of a width ratio by dividing a predetermined width by the measured width or a height ratio by dividing a predetermined height by the measured height; and
multiplying at least one of the width ratio or the height ratio by a predetermined distance;
determine a size of the display, the display being in communication with the camera; and
scale the image based on the determined distance of the person's face and the determined size of the display, the scaled image having a size, when measured as a proportion of the display, inversely proportional to the determined size of the display.

* * * * *